United States Patent
Kunimoto (10) Patent No.: US 6,873,512 B2
(45) Date of Patent: Mar. 29, 2005

(54) ELECTRONIC EQUIPMENT AND ELECTRONIC EQUIPMENT ACTIVATION METHOD

(75) Inventor: Isao Kunimoto, Saitama (JP)

(73) Assignee: Sony Corporation, Tokyo (JP)

( * ) Notice: Subject to any disclaimer, the term of this patent is extended or adjusted under 35 U.S.C. 154(b) by 355 days.

(21) Appl. No.: 10/024,991

(22) Filed: Dec. 19, 2001

(65) Prior Publication Data

US 2002/0116077 A1 Aug. 22, 2002

(30) Foreign Application Priority Data

Dec. 20, 2000 (JP) .................................... P2000-387693

(51) Int. Cl.$^7$ ............................................. H01H 73/00
(52) U.S. Cl. .......................... 361/115; 361/18; 361/62; 361/119
(58) Field of Search .............................. 361/62, 64, 66, 361/71, 72, 91.1, 115, 18, 119

(56) References Cited

U.S. PATENT DOCUMENTS 4,837,810 A * 6/1989 Prey ............................ 379/242

* cited by examiner

Primary Examiner—Stephen W. Jackson
(74) Attorney, Agent, or Firm—Sonnenschein, Nath & Rosenthal LLP (57) ABSTRACT

If an activation error occurs, after activation is executed for all devices, a device in which the activation error has occurred is reactivated. When the power supply of a television receiver is turned on, a control unit reads last conditions from a memory, and executes initialization according to the last conditions. When the television receiver is activated or the contents of settings are modified, if an activation error occurring in a tuner, a video processing unit, a sound output system, or any other device is detected, the activation error is recorded in a nonvolatile memory by setting a flag. A device recorded with the flag set is then restored (reactivated).

10 Claims, 6 Drawing Sheets

ELECTRONIC EQUIPMENT AND ELECTRONIC EQUIPMENT ACTIVATION METHOD

RELATED APPLICATION DATA

The present application claims priority to Japanese Application(s) No(s). P2000-387693 filed Dec. 20, 2000, which application(s) is/are incorporated herein by reference to the extent permitted by law.

BACKGROUND OF THE INVENTION

1. Field of the Invention

The present invention relates to an electronic equipment including a plurality of devices, and an electronic equipment activation method. More particularly, the present invention is concerned with an electronic equipment having any of a plurality of devices thereof, in which an activation error has occurred, reactivated, and an electronic equipment activation method for reactivating any of a plurality of devices in which an activation error has occurred.

2. Description of the Related Art

In order to activate an electronic equipment composed of a plurality of devices, after one device is activated, a subsequent device is activated. During the activation, a device that is unsuccessfully activated repeatedly undergoes activation until it is activated normally.

However, in a conventional electronic equipment, every time a device is activated, parameters must be checked. If any device is unsuccessfully activated, repetitive actions involved in initialization must be performed on the device. This poses a problem in that it takes much time to complete activation of the entire electronic equipment, or the time required to complete activation is uncertain.

As measures taken to avoid the above problem, or in efforts to put emphasis on obedience to a user's instruction, the time required to complete activation may be limited to a certain value. In this case, an action of exiting from a loop is included for fear repetitive actions may loop endlessly. Although a certain device is activated abnormally, activation may be terminated. Therefore, if any device that cannot be refreshed (updated) after being activated is unsuccessfully activated, the power supply of an electronic equipment must be turned on again in order to restart activation.

SUMMARY OF THE INVENTION

The present invention attempts to break through the foregoing current situation. An object of the present invention is to provide an electronic equipment capable of having any device thereof, in which an activation error has occurred for some reasons, reactivated after activation is executed for all devices thereof, and to provide an activation method for the electronic equipment.

According to the present invention, an electronic equipment is composed of a plurality of devices that are activated externally. The electronic equipment includes a control means that activates and controls the plurality of devices, detects a device, in which an activation error has occurred, from among the plurality of devices, and reactivates the detected devices, in which an activation error has occurred, after activation is executed for all the devices.

The control means detects an activation error by checking if an acknowledge is returned from the plurality of devices, and records the activation error by setting a flag.

Consequently, according to the present invention, if an activation error occurs in an electronic equipment for some reasons during activation of any device, a flag indicating occurrence of an activation error is set and stored in a memory. Herein, the activation error may stem from a communication failure between internal circuits that is derived from an increase in internal processing time. A device in which an activation error has occurred is reactivated after activation is executed for all the devices. Therefore, a drawback attributable to the fact that the control means serving as a main controller is concentrated in activation of a device in which an activation error has occurred.

Moreover, an electronic equipment activation method in accordance with the present invention is an activation method for an electronic equipment composed of a plurality of devices that are activated externally. The electronic equipment activation method includes a step of activating and controlling the plurality of devices, detecting a device, in which an activation error has occurred, from among the plurality of devices, and a step of reactivating the detected device, in which an activation error has occurred, after activation is executed for all the devices.

An activation error is detected by checking if an acknowledge is returned from the plurality of devices, and recorded by setting a flag.

Consequently, according to the electronic equipment activation method in accordance with the present invention, even if an activation error occurs for some reasons during activation of any device, a flag indicating occurrence of an activation error is set and stored in a memory. Herein, the activation error may stem from a communication failure between internal circuits that is derived from an increase in internal processing time. The device in which an activation error has occurred is reactivated after activation is executed for all the devices. Therefore, a drawback attributable to the fact that a control means serving as a main controller is concentrated on activation of a device in which an activation error has occurred can be prevented.

DETAILED DESCRIPTION OF THE PREFERRED EMBODIMENTS

An example of an embodiment of the present invention will be described with reference to the drawings. An electronic equipment in accordance with the embodiment of the present invention is composed of a plurality of devices that are activated externally. The electronic equipment includes a control means that activates and controls the plurality of devices, detects a device, in which an activation error has occurred, from among the plurality of devices, and reactivates the detected device, in which an activation error has occurred, after activation is executed for all the devices. Moreover, the control means detects an activation error, which has occurred in a device, by checking if an acknowledge is returned from the plurality of devices, and records an activation error, which has occurred in a device, by setting a flag. Thus, the device in which an activation error has occurred can be reactivated. The present embodiment will be described on the assumption that the electronic equipment is constructed as a television receiver.

Figure 1:
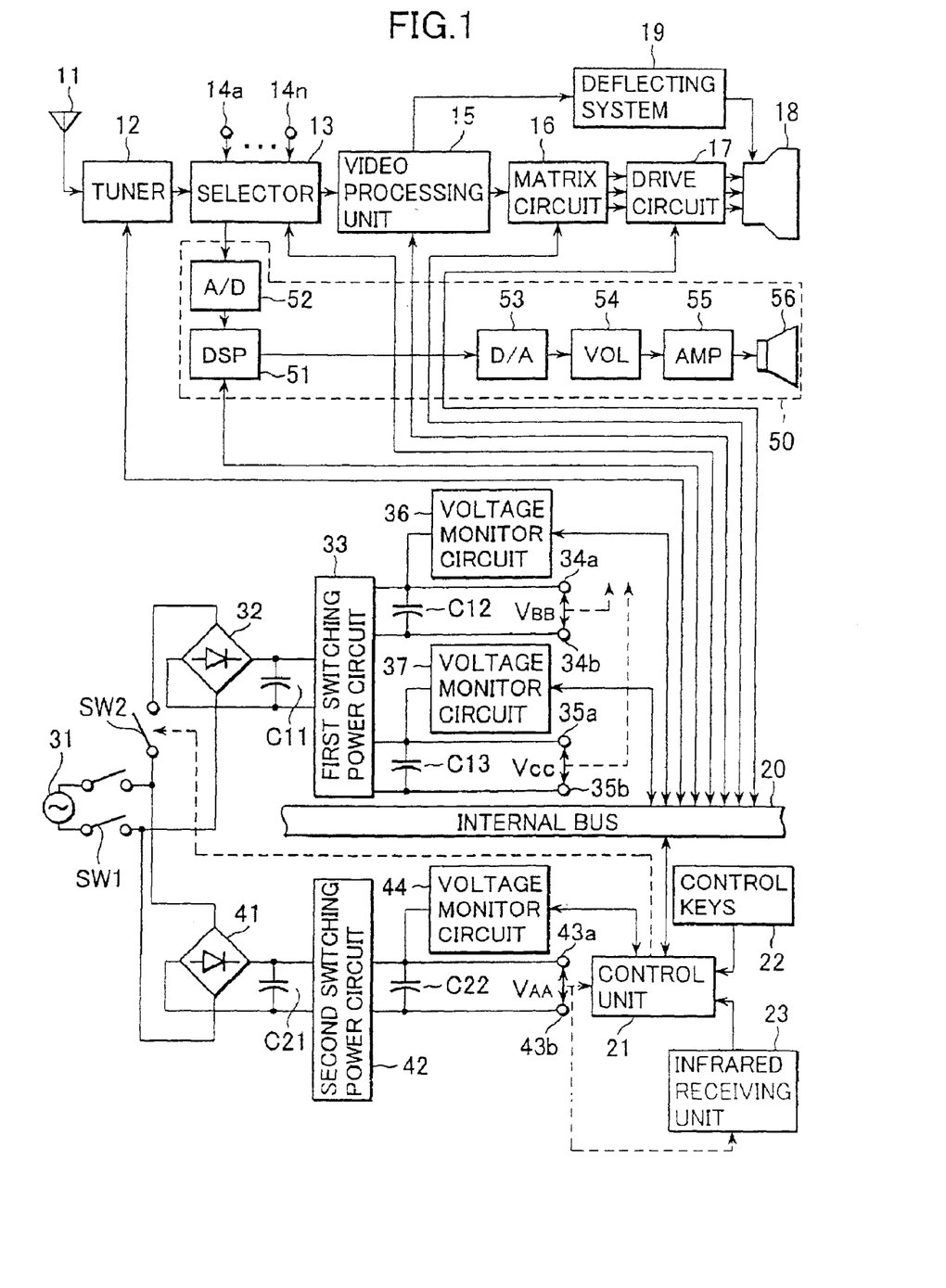
FIG. 1 is a block diagram for explaining the configuration of a television receiver that is presented as an example of an embodiment of the present invention.

The embodiment of the present invention will be described on the assumption that the present invention is implemented in, as shown in FIG. 1, the electronic equipment configured as a television receiver, or more particularly, a sound output system. Specifically, the television receiver 1 consists mainly of, as basic circuits, an antenna 11, a tuner 12, a selector 13, a video processing unit 15, a matrix circuit 16, a drive circuit 17, a cathode-ray tube 18, a deflecting system 19, an internal bus 20, a control unit 21, control keys 22, an infrared receiving unit 23, a diode bridge 32, a first switching power circuit 33, voltage monitor circuits 36 and 37, a diode bridge 41, a second switching power circuit 42, a voltage monitor circuit 44, and a sound output system 50.

In the television receiver 1, the above components act as described below. That is to say, the tuner 12 receives radio-frequency waves, which fall within a predetermined television channel, through the antenna 11, acquires a video signal, and transfers the video signal to the selector 13. Video signals received through a plurality of external input terminals 14a to 14n are also transferred to the selector 13. The selector 13 selects any of the video signal transferred from the tuner 12 and the predetermined video signals received through the external input terminals 14a to 14n, and transfers the selected video signal to the video processing unit 15. The video processing unit 15 performs various kinds of necessary processing on the video signal transferred from the selector 13, and transfers the resultant signal to the matrix circuit 16. The video signal treated by the video processing unit 15 is transferred to the matrix circuit 16 and converted to primary color signals R, G, and B. The drive circuit 17 converts the resultant primary color signals R, G, and B into driving signals with which the cathode-ray tube 18 is driven. An electron gun included in the cathode-ray tube 18 is thus driven. Moreover, synchronizing signals that are components of the video signal separated from each other in the video processing unit 15 are transferred to the deflecting system 19. A deflecting coil (not shown) in the cathode-ray tube 18 is thus driven.

Actions of the circuits constituting the television receiver 1 are centralized and controlled by the control unit 21 that serves as a system controller included in the television receiver 1. The control unit 21 is designed to issue a command to each circuit over the internal bus 20. Based on control information produced with a press of any of the control keys 22 or a remote control signal received from a remote control apparatus by the infrared receiving unit 23, the control unit 21 selects a channel, selects an input, or controls a display mode or the like. The control unit 21 detects the controlled state of each component by checking an associated flag. The control unit 21 has a memory, for example, a nonvolatile memory in which the flag is stored. When the power supply of the television receiver 1 is turned on, last conditions stored in the memory are read out. Based on the last conditions, the control unit 21 initializes the components interconnected over the internal bus 20 so as to set them to states corresponding to the last conditions. The last conditions restored through initialization include, for example, the setting of a television channel within which radio-frequency waves to be received by the tuner 12 fall, the setting of an input to be selected by the selector 13, the setting of a display mode in which the video processing unit 15 treats a signal, and the setting of a volume at which a sound processing unit treats sounds. Moreover, if the control unit 21 detects an activation error occurring in any of the devices, that is, the tuner 12, video processing unit 15, and sound output system 50 during activation of the television receiver 1 or modification of the contents of the settings, the control unit 21 performs restoration (reactivation) that will be described later. In other words, the control unit 21 can be regarded as a control means having, as internal facilities, an activation control facility, an activation error detecting facility, and a reactivation control facility.

The sound output system 50 shown in FIG. 1 includes a digital signal processor (DSP) 51 for treating sounds, an analog-to-digital (A/D) converter 52, a digital-to-analog (D/A) converter 53, a volume (VOL) converter 53 for converting a volume to another, an amplifier (AMP) 55 for generating sounds, and a loudspeaker 56. Herein, the A/D converter 52 and D/A converter 53 maybe replaced with a sound coder/decoder (codec) having the capabilities of the two converters.

The television receiver 1 of the present embodiment has two power circuits independently of each other. The two power circuits include a power circuit that feeds power to the control unit 21 and its peripheral circuits, and a power circuit that feeds power to circuits that receives a television signal. The circuits for receiving a television signal starts with the tuner 12 and includes the cathode-ray tube 18 and deflecting system 19. The television receiver 1 adopts a mains ac power supply 31 as an input power supply. The mains ac power supply 31 is an ac power supply that develops an ac voltage ranging from, for example, 110 V to 240 V. An input unit is coupled to a power line over which the ac voltage developed from the mains ac power supply 31 is applied. The input unit is connected to the diode bridge 32 with a power switch SW1 and a switch SW2 between them. A supply current rectified by the diode bridge 32 is fed to the first switching power circuit 33. The power switch SW1 is a switch that is hand-operated in order to turn on the power supply. The switch SW2 is a switch to be controlled by the control unit 21 as described later. But for a command issued from the control unit 21, the switch SW2 remains off. The first switching power circuit 33 consists of a switching device that are alternately placed in the on and off states with application of a high-frequency voltage, such as, a switching transistor and a control circuit for controlling the device. The first switching power circuit 33 develops a dc low voltage in the secondary circuit thereof in proportion to an input voltage that ranges from 110 V to 240 V. A relatively large-capacity power circuit is adopted as the first switching power circuit 33. A capacitor C11 included in the primary circuit of the first switching power circuit 33 is connected between the switching power circuit 33 and diode bridge 32.

The secondary or output circuit of the first switching power circuit 33 develops a supply voltage $V_{BB}$ between terminals 34a and 34b and a supply voltage $V_{CC}$ between terminals 35a and 35b. A smoothing capacitor C12 is connected between the first switching power circuit 33 and the terminals 34a and 34b. The voltage monitor circuit 36 monitors the value of the supply voltage $V_{BB}$ developed between the terminals 34a and 34b. A smoothing capacitor C13 is connected between the first switching power circuit 33 and the terminals 35a and 35b. The voltage monitor circuit 37 monitors the value of the supply voltage $V_{CC}$ developed between the terminals 35a and 35b. The outputs of the voltage monitor circuits 36 and 37 are transmitted to the control unit 21 over the internal bus 20. Herein, the supply voltage $V_{BB}$ shall be 5 V and the supply voltage $V_{CC}$ shall be 12 V.

The supply voltage $V_{BB}$ developed between the terminals 34a and 34b is applied to circuits that require the voltage of 5 V out of all the circuits that start with the tuner 12 and include the cathode-ray tube 18 and deflecting system 19 and that receive a television signal. Moreover, the supply voltage $V_{CC}$ developed between the terminals 35a and 35b is applied to circuits that require the voltage of 12 V out of all the circuits that start with the tuner 12 and include the cathode-ray tube 18 and deflecting system 19 and that receive a television signal.

In order to apply a supply voltage to the control unit 21 and its peripheral circuits, the input unit coupled to the power line over which ac power is supplied from the mains ac power supply 31 is connected to the diode bridge 41 with the power switch SW1 between them. A supply current rectified by the diode bridge 41 is fed to the second switching power circuit 42. The second switching power circuit 42 consists of a switching device that is alternately placed in the on and off states with application of a high-frequency voltage, such as, a switching transistor, and a control circuit for controlling the device. The second switching power circuit 42 develops a dc low voltage in the secondary circuit thereof in proportion to an input voltage that ranges from 110 V to 240 V. A relatively small-capacity power circuit is adopted as the second switching power circuit 42. A capacitor C21 included in the primary circuit of the second switching power circuit 42 is connected between the switching power circuit 42 and diode bridge 41.

The secondary or output circuit of the second switching power circuit 42 develops a supply voltage $V_{AA}$ between terminals 43a and 43b. A smoothing capacitor C22 is connected between the second switching power circuit 42 and the terminals 43a and 43b. The voltage monitor circuit 44 monitors the value of the supply voltage $V_{AA}$ developed between the terminals 43a and 43b. In this case, a time constant required for discharging the smoothing capacitor C21 is larger than that for discharging the smoothing capacitor C11 connected to the primary circuit of the first switching power circuit 33. Thus, the time required to fully discharge the smoothing capacitor C21 is made longer. An output of the voltage monitor circuit 44 is transmitted to the control unit 21. Herein, the supply voltage $V_{AA}$ is 5 V. The supply voltage $V_{AA}$ between the terminals 43a and 43b is applied to the control unit 21 and infrared receiving unit 23 respectively.

Figure 2:
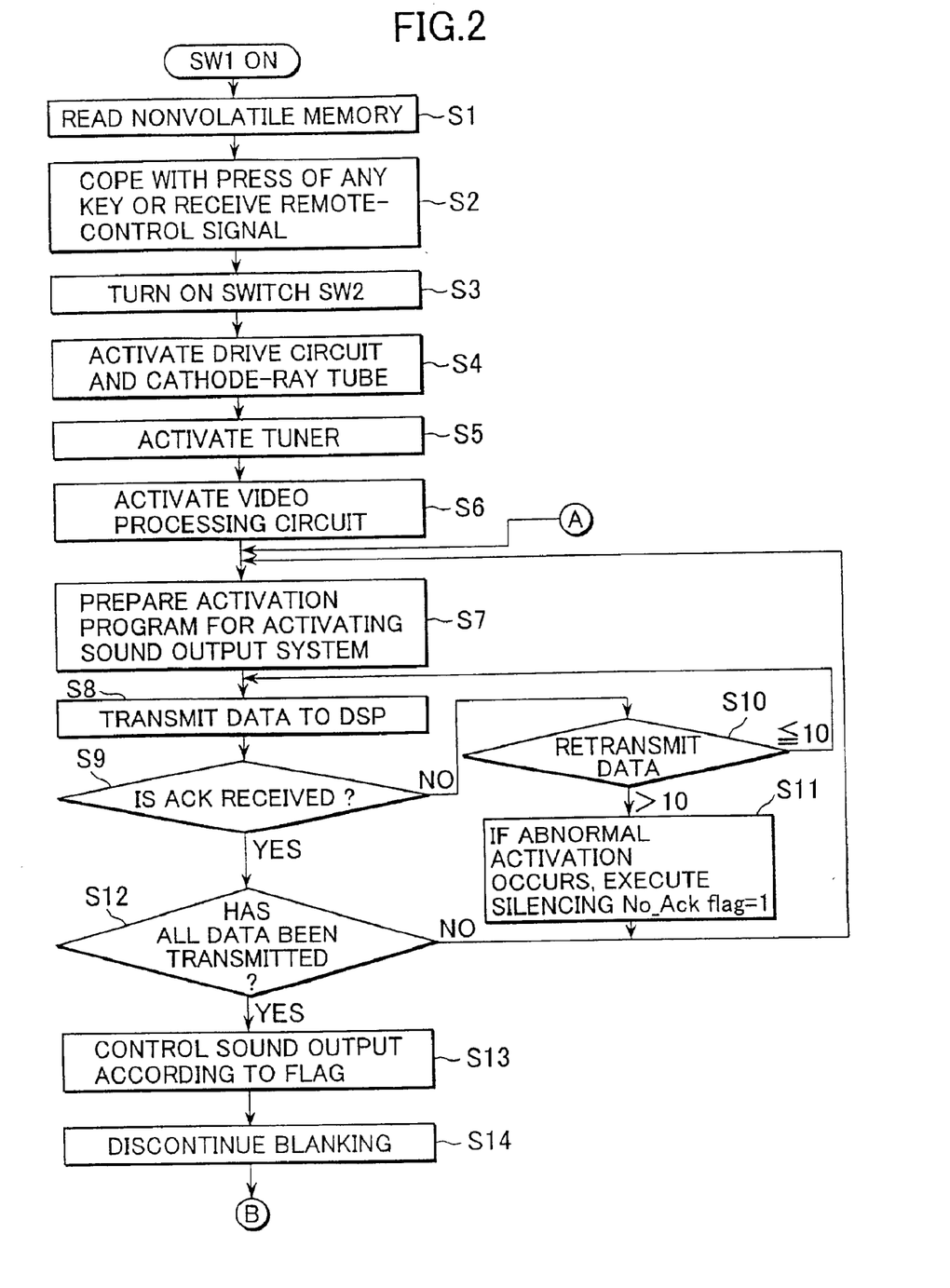
FIG. 2 is a flowchart describing actions to be performed for activating the television receiver that is an example of the embodiment of the present invention or for modifying the contents of settings.
Figure 3:
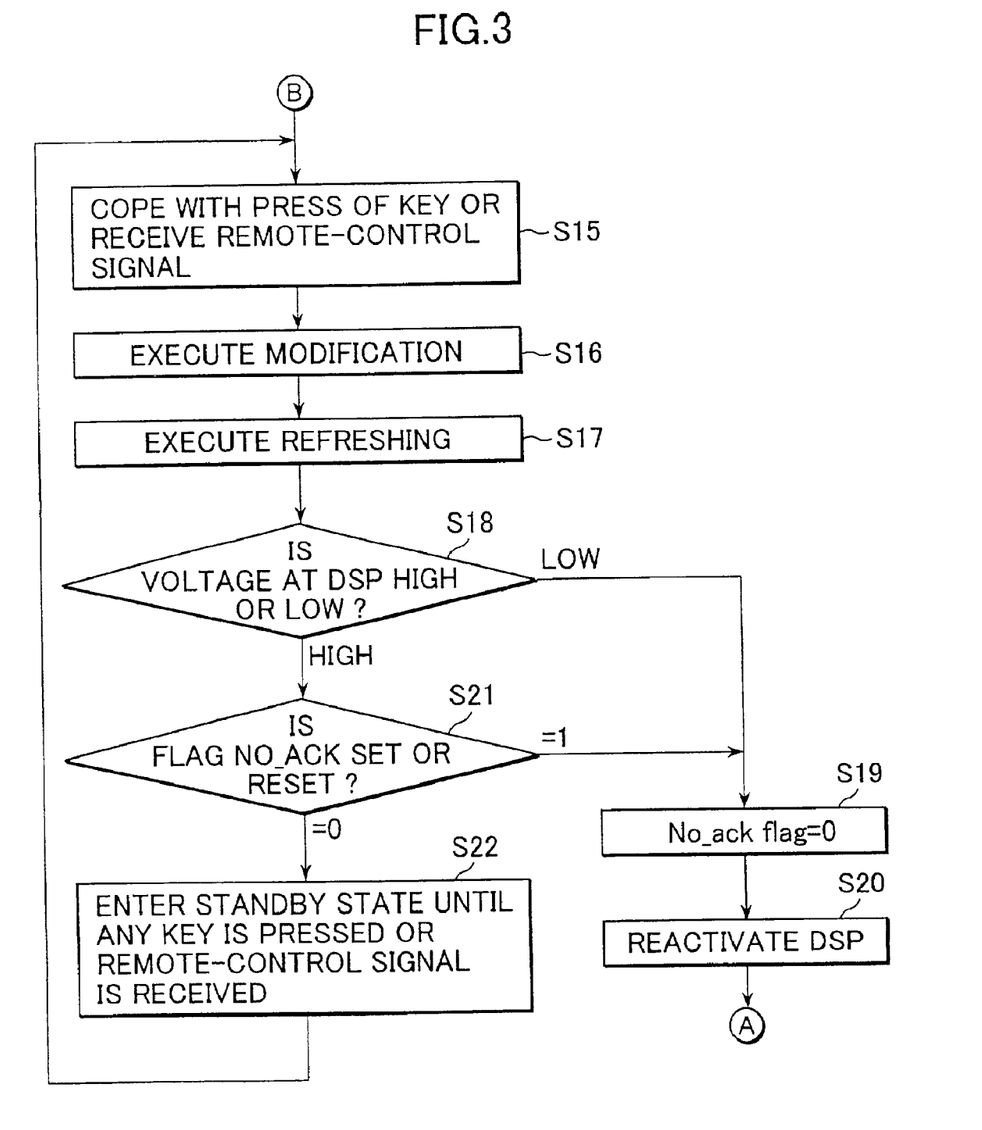
FIG. 3 is a flowchart describing actions to be performed for activating the television receiver that is an example of the embodiment of the present invention or for modifying the contents of settings.

Next, processing to be performed when the power supply of the television receiver 1 is turned on or the settings thereof are modified will be described in conjunction with FIG. 2 and FIG. 3. FIG. 2 and FIG. 3 describe processing to be performed when the present invention is implemented in an electronic equipment that is the television receiver 1, or especially, in a sound output system incorporated in the electronic equipment.

When a user turns on the power switch SW1, a rectified alternating current is fed to the second switching power circuit 42. The supply voltage $V_{AA}$ is then developed between the terminals 43a and 43b of the secondary circuit of the second switching power circuit 42. Consequently, the supply voltage is applied to the control unit 21 and its peripheral circuits. This causes the control unit 21 to start acting.

At step S1, the control unit 21 reads the last conditions from the incorporated nonvolatile memory, and transfers initialization data based on the last conditions to the circuits over the internal bus 20. Consequently, receiving a television signal is started with the circuits set to the last conditions.

At step S2, the control unit 21 switches channels, adjusts a volume, and changes display modes so as to thus change controlled states responsively to a press of any of the control keys 22 or a remote-control signal received by the infrared receiving unit 23. In response to a control signal produced responsively to a press of any key or based on the remote-control signal, the data of the last conditions stored in the memory in the control unit 21 is updated.

At step S3, the control unit 21 turns on the switch SW2 that turns on or off the internal main power supply, and thus feeds a rectified alternating current to the first switching power circuit 33. At this time, the voltages $V_{BB}$ and $V_{CC}$ developed from the first switching power circuit 33 are applied to the circuits that start with the tuner 12 and include the cathode-ray tube 18 and deflecting system 19 and that receive a television signal. This causes the circuits to start receiving a television signal.

First, the drive circuit 17 and cathode-ray tube 18 are activated (step S4), and the tuner 12 is then activated (step S5). Thereafter, the video processing unit 15 is activated (step S6). The detailed description of activation of these components at the steps will be omitted.

At step S7, the control unit 21 prepares an activation program that activates the sound output system 50 and coefficients.

At step S8, the control unit 21 transmits data, which is required to set a volume and others, to the DSP 51. According to the present embodiment, the data is transmitted at a clock rate attained on the bus, 100 kHz, as a signal having a frequency of 11 kHz and a pulse duration of 0.1 msec. Every time the DSP 51 receives the data of the frequency from the control unit 21, the DSP 51 returns an acknowledge (ACK) relevant to the data to the control unit 21.

At step S9, the control unit 21 detects an activation error by checking a response sent from a device. Specifically, the control unit 21 judges if an ACK is received from the DSP 51. If the ACK is not received, the control unit 21 at step S10 retransmits the same data as that transmitted at step S8 to the DSP 51, and returns control to step S8. It is determined in advance that retransmission of data is repeated, for example, ten times. Alternatively, the retransmission may be set to be repeated for a predetermined period, for example, several milliseconds. Although the retransmission is repeated a predetermined number of times, if an acknowledge is not sent from a device the control unit 21 sets a flag to record the occurrence of an activation error in the device. Specifically, although data required to set a volume or the like is transmitted to the DSP 51 ten times, if the ACK is not returned, the DSP 51 is judged as an activation error-stricken device at step S11. The sound output system 50 is then silenced because of abnormal activation. Concurrently, the control unit 21 sets a flag No__ACK, which indicates occurrence of an activation error, to 1. Control is then returned to step S7.

In contrast, if reception of an ACK is confirmed at step S9, the control unit 21 judges whether data transmission to the sound output system 50 has been completed. If data transmission to the sound output system 50 has not been completed, the control unit 21 repeats the activation steps starting with step S7. If the data transmission has been completed, control is passed to step S13. If reactivation of the device in which an activation error has occurred is repeated at this step, the time required to complete activation may get longer or uncertain. In order to avoid this incident, when a flag indicating occurrence of an activation error is set, the DSP 51 is recognized as an activation error-stricken device. The reactivation is given up in this stage. Prepared data is transmitted and passage of a transition time required to make a transition to the next processing is awaited. Control is then passed to step S13.

After activation is executed for all the devices, sound output by the sound output system 50 is controlled based on the state of the flag at step S13. Specifically, if the flag No__ACK is set to 1, silencing is continued. If the DSP 51 is activated normally, silencing is discontinued. At step S14, blanking of a video signal performed by the drive circuit 17 and cathode-ray tube 18 is discontinued.

As mentioned above, if it is found at step S11 that an ACK is not returned despite a predetermined times of transmission, the control unit 21 recognizes the DSP 51 as an activation error-stricken device, and sets the flag indicating occurrence of an activation error. The control unit 21 escapes from the reactivation routine. It is thus prevented that when the control unit 21 repeats reactivation of an activation error-stricken device, the time required to activate the other devices or all the devices becomes uncertain.

At step S15 continuing from B in FIG. 3, a press of any key is coped with or a remote-control signal is received.

At step S16, modification is executed responsively to the press of a key or the remote-control signal. At step S17, the control unit 21 executes refreshing.

Thereafter, at step S18, the control unit 21 detects a voltage developed at the output voltage terminal (alive terminal) of the DSP 51 so as to judge whether the DSP 51 is activated. At this time, if the voltage at the alive terminal of the DSP 51 is low, that is, the DSP 51 is activated abnormally, the flag indicating occurrence of an activation error is reset to 0 at step S19. Reactivation of the DSP 51 is started at step S20, and the activation starting at step S7 is restarted. Detection of the state of the DSP 51 performed by the control unit 21 is an action performed at regular intervals, that is, regularly.

If it is found at step S18 that the voltage at the output voltage terminal of the DSP 51 is high, the control unit 21 checks at step S21 if the flag indicating occurrence of an activation error is set. If the flag No__ACK is set to 1, that is, although the DSP 51 is activated, if the flag indicating occurrence of an activation error is set, control is passed to step S19. At step S20, reactivation of the DSP 51 is started. If the flag No__ACK is reset to 0, that is, the DSP 51 is activated normally, control is passed to step S22. A standby state is attained in order to wait for a press of any key or a remote-control signal. The actions starting at step S15 are repeated responsively to a press of any key or a remote-control signal.

As mentioned above, the television receiver 1 is an example of an electronic equipment in accordance with the present invention. Once activation is executed for all the devices constituting the television receiver, it is checked whether the flag indicating occurrence of an activation error is set. Reactivation is performed on a device that is recorded with the flag indicating occurrence of an activation error set. It is therefore possible to repeat reactivation until the device in which an activation error has occurred becomes workable. This is different from a wait time method in which activation of a device is not started until activation of a previous device is completed. Therefore, influence of a communication failure or the like can be minimized. Herein, the communication failure stems from instantaneous discontinuation of application of a voltage that takes place at specific timing, instantaneous discontinuation thereof that takes place irregularly repeatedly, or an increase in an internal processing time required by the devices.

Figure 4:
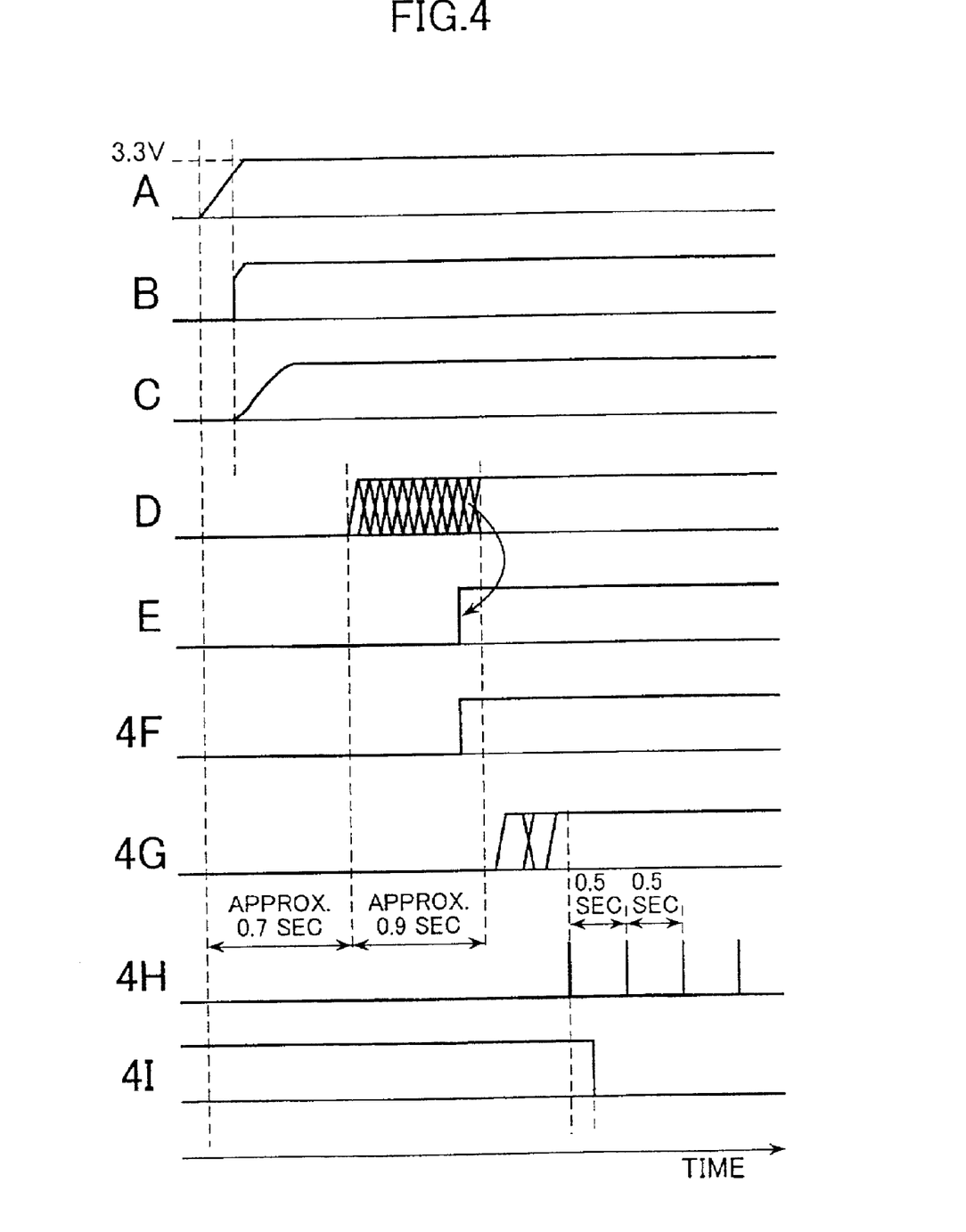
FIG. 4 is an explanatory diagram for explaining actions of components time-sequentially on the assumption that when the television receiver presented as an example of the embodiment of the present invention is activated, a supply voltage assumes a normal value.
Figure 5:
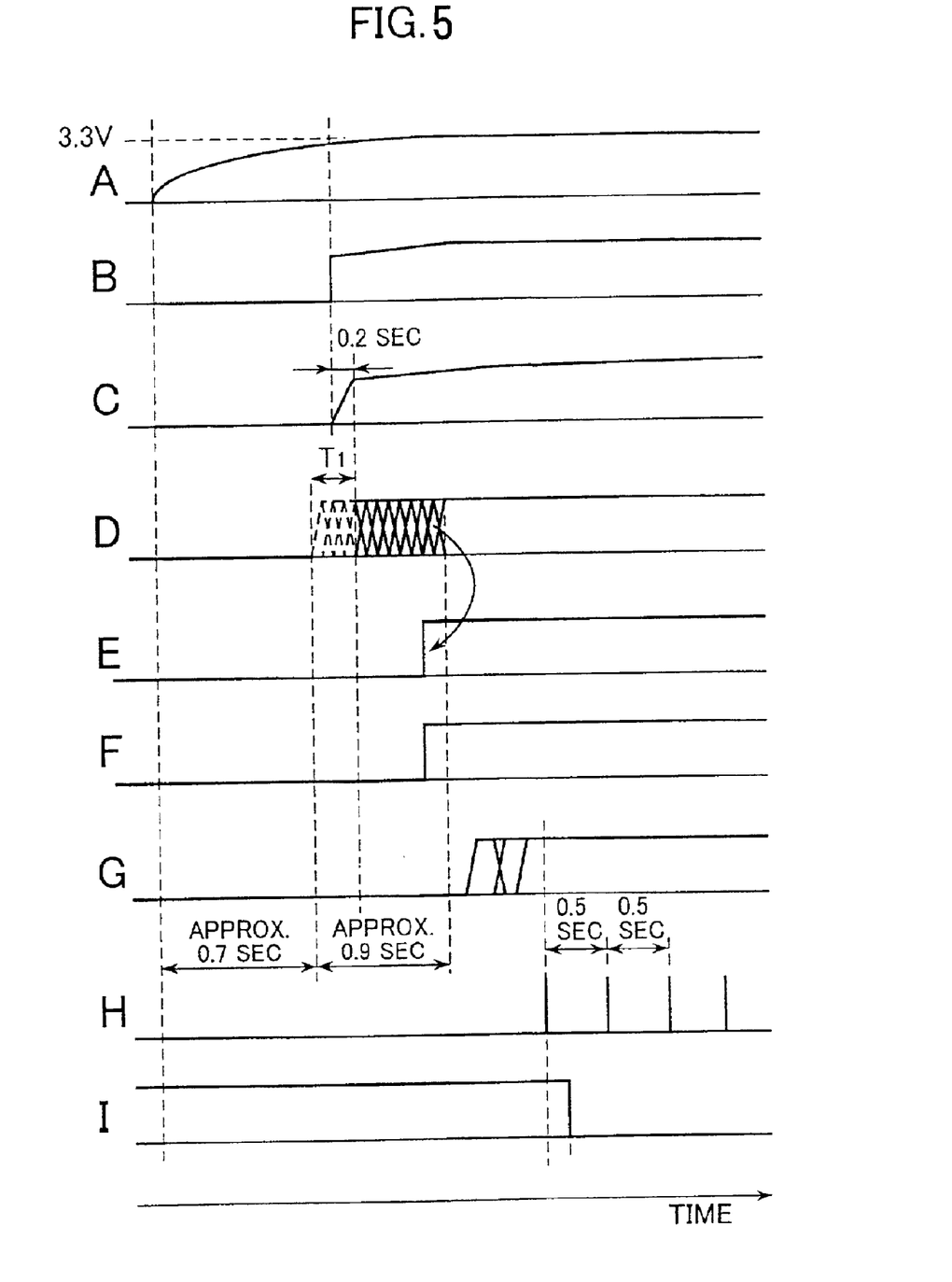
FIG. 5 is an explanatory diagram for explaining actions of components time-sequentially on the assumption that when the television receiver presented as an example of the embodiment of the present invention is activated, a supply voltage assumes an abnormal value.

FIG. 4 and FIG. 5 illustratively imply the foregoing activation to be performed when the power supply is turned on. Referring to FIG. 4 and FIG. 5, A denotes the state of a supply voltage. According to the present embodiment, the supply voltage is set to a value of 3.3 V permitting the devices to be activated without a problem. B denotes the state of a detected supply voltage. C denotes a supply voltage applied to the DSP 51. D denotes data that is transmitted from the control unit 21 to the DSP 51 and based on which a volume is determined. The data is transmitted as a signal, which has a frequency of 11 kHz, that is, a pulse duration of 0.1 msec, at a clock rate attained on the bus, 100 kHz. Every time the DSP 51 receives the data from the control unit 21, the DSP 51 returns an acknowledge (ACK) relevant to the data. E denotes the state of a voltage developed at the output voltage terminal (alive terminal) of the DSP 51. Namely, if the voltage E is high, it signifies that the DSP 51 is activated normally. F denotes the state of a voltage developed at the output voltage terminal of the DSP 51 and detected by the control unit 21. G denotes a signal transferred to the D/A converter 53. H denotes a cycle during which the control unit 21 detects the voltage E at the output voltage terminal of the DSP 51. I denotes a control signal with which sounds to be generated are limited. In other words, when the control signal is driven high, silencing is performed. When the control signal is driven low, silencing is discontinued. In FIG. 4 and FIG. 5, the voltages or signals A to I are expressed as functions of time.

FIG. 4 shows the actions of the components of the television receiver 1 performed in case a supply voltage assumes a normal value during activation of the television receiver 1.

When the supply voltage A reaches 3.3 V that is the voltage value permitting activation of the television receiver without any problem, the fact is detected. Feeding of a current to the DSP 51 is started (C). This causes a voltage applied to the DSP 51 to rise gradually. When approximately 0.7 sec has elapsed since activation is started, that is, since the power switch SW1 is turned on, the control unit 21 starts transmitting data to the DSP 51 as shown in FIG. 4. The transmission of the data continues for approximately 0.9 sec (H). When the supply voltage to be applied to the DSP 51 reaches a value that is large enough to activate the DSP 51, data based on which a volume or the like is determined is transmitted from the control unit 21 to the DSP 51 (D). When the data is transmitted, the voltage at the output voltage terminal (alive terminal) of the DSP 51 is driven high to get stable (E). When the voltage at the alive terminal is detected (F), data is transferred to the D/A converter 53 (G). After a predetermined time elapses, the control unit 21 detects the voltage at the output voltage terminal of the DSP 51 at regular intervals of, herein, 0.5 sec (H). After activation is completed, when the predetermined time elapses, the signal indicating that sounds to be generated should be limited is driven low. Silencing is discontinued (I).

FIG. 5 implies the actions of the components of the television receiver 1 performed in case a supply voltage assumes an abnormal value during activation of the television receiver 1.

If some time is required until a supply voltage rises to 3.3 V, the DSP is delayed to start up (C). However, the control unit 21 starts transmitting data in approximately 0.7 sec after activation is started, that is, the power switch SW1 is turned on (D). Therefore, when the DSP 51 starts up, the control unit 21 has already transmitted data. The DSP 51 cannot therefore receive the data during a time interval T1. Accordingly, an acknowledge ACK is not returned to the control unit 21 during the time interval T1. However, although the leading part or middle part of the data is not received, the voltage at the output voltage terminal (alive terminal) of the DSP 51 is driven high to get stable. Consequently, although part of the initialization data is not received from the control unit 21, that is, although the DSP 51 is activated abnormally, activation may be terminated.

Even in this case, as far as the television receiver 1 is concerned, the device that is left intact despite occurrence of an activation error is recorded by setting the flag which indicates occurrence of an activation error. After activation is executed for all the devices, the device left intact despite the occurrence of an activation error can be reactivated. Consequently, a drawback that activation of the entire receiver is not completed because activation of one of a plurality of devices is not completed can be overcome.

Now, a routine for monitoring a supply voltage that is performed in the television receiver 1 will be detailed. The control unit 21 in the television receiver 1 checks the outputs of the voltage monitor circuits 36, 37, and 44 that represent monitored supply voltage values all the time, and extends control according to the result of the checking.

During the routine, the control unit 21 judges whether the value of the supply voltage $V_{BB}$ detected by the voltage monitor circuit 36 falls within a certain range permitting normal operation. Moreover, the control unit 21 judges whether the value of the supply voltage $V_{CC}$ detected by the voltage monitor circuit 37 falls within a certain range permitting normal operation. If it is judged that the supply voltage value falls within the certain range, the routine is continued. If it is judged that the supply voltage value falls below the certain range, control is returned to initialization, that is, to the step of transferring data based on which the circuits that must be initialized are set to their last conditions. However, in the meantime, the switch SW2 remains on. Moreover, when the voltage monitor circuit 44 for monitoring a voltage applied to the control unit 21 detects that the supply voltage $V_{AA}$ assumes an abnormal value, the control unit 21 executes initialization.

As mentioned above, according to the present embodiment, the television receiver 1 includes two power circuits, that is, the power circuit for feeding power to the major circuits that receives a television signal and the power circuit for feeding power to the control system. In a standby state in which no image is displayed, the second switching power circuit 42 of a small capacity alone is actuated. Consequently, power will not be wasted in the standby state. This leads to a reduction in power consumption in the standby state.

The capacitor C21 included in the primary circuit of the switching power circuit 42 for feeding power to the control unit 21 and the smoothing capacitor C22 connected to the switching power circuit 42 are realized with capacitors that require a relatively large time constant for discharge. If an abnormality such as an instantaneous drop of an input ac supply voltage takes place, as long as the ac voltage VAA is kept applied to the control unit 21 for a time interval corresponding to the time constant for discharge, the control unit 21 keeps working. Consequently, the control unit 21 can cope with an instantaneous fluctuation of the ac supply voltage.

A time constant required for discharging the smoothing capacitor C11 connected to the primary circuit of the switching power circuit 33 is smaller than that required for discharging the smoothing capacitor C21 connected to the switching power circuit 42. If an abnormality such as an instantaneous drop of an input ac supply voltage takes place, the dc voltages $V_{BB}$ and $V_{CC}$ developed from the switching power circuit 33 that feeds power to the major circuits drop instantaneously. At this time, the circuits that are actuated with the dc voltages $V_{BB}$ and $V_{CC}$ may act incorrectly because the supply voltages are not applied temporarily. Based on the supply voltages detected by the voltage monitor circuits 36 and 37, the control unit 21 executes initialization again. The circuits that are actuated with the dc supply voltages $V_{BB}$ and $V_{CC}$ can therefore be restored from the states in which the circuits undergo a temporal voltage drop to the original action states.

Figure 6:
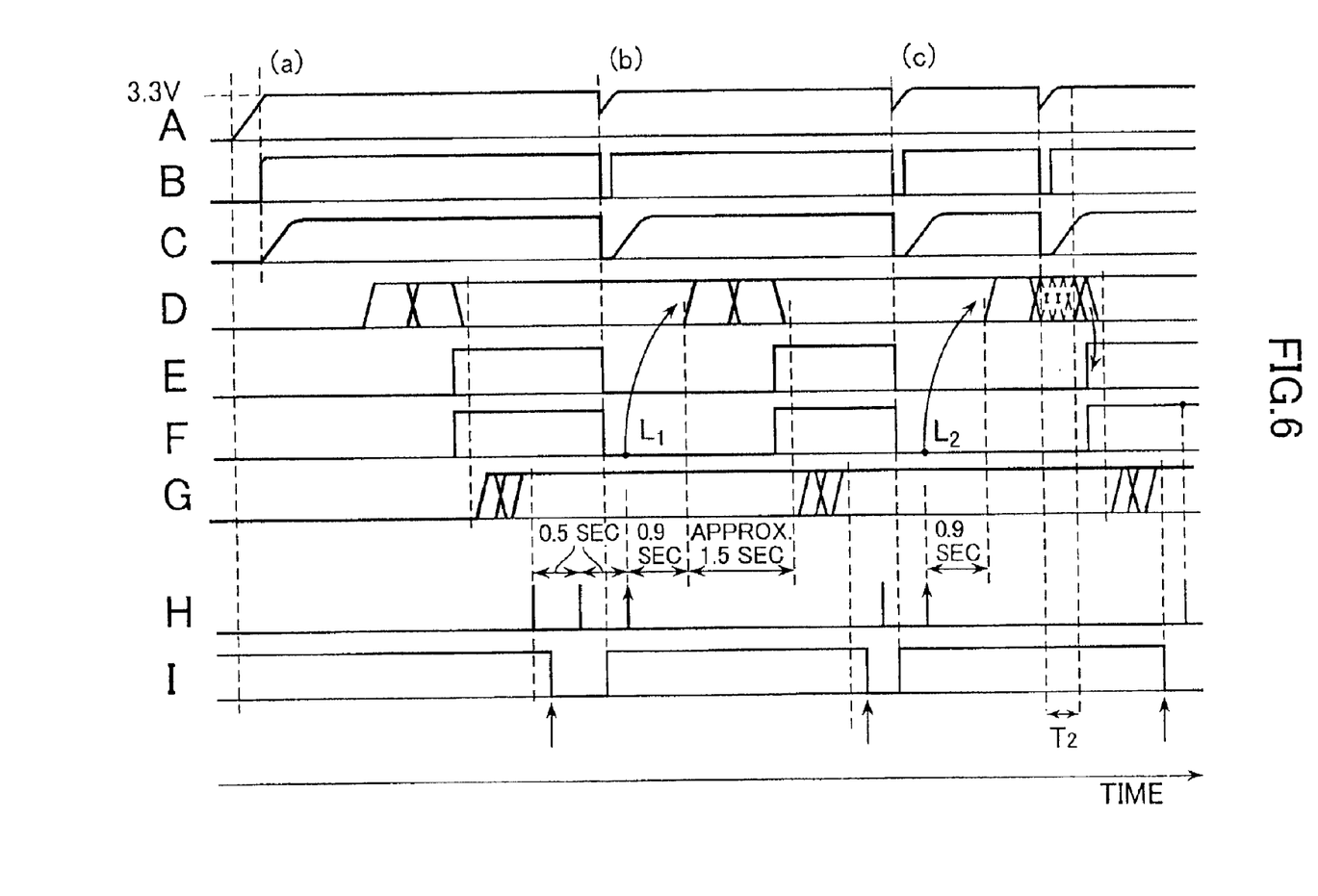
FIG. 6 is an explanatory diagram for explaining actions of components time-sequentially on the assumption that when instantaneous discontinuation of application of a supply voltage occurs frequently in the television receiver presented as an example of the embodiment of the present invention.

The action timings of the voltage monitor circuits 36 and 37, control unit 21, and DSP 51 at which a temporal voltage drop is detected and the original action states are restored will be described in conjunction with FIG. 6. FIG. 6 implies the actions of the components performed when application of a supply voltage is discontinued instantaneously, or more particularly, the instantaneous discontinuation occurs frequently.

Referring to FIG. 6, (a) denotes a period during which the components are activated normally as implied in FIG. 4. Assume that instantaneous discontinuation of application of a voltage occurs during a period (b) shown in FIG. 6. After a predetermined time elapses, the control unit 21 detects a voltage developed at the output voltage terminal of the DSP 51 at regular intervals (of 0.5 sec). At a time instant L1 after the instantaneous discontinuation of voltage application is reflected on the voltage at the output voltage terminal of the DSP 51 (E), the control unit 21 becomes aware of the instantaneous discontinuation for the first time. If the voltage at the output voltage terminal is low, after a predetermined time elapses since the low-level voltage is detected, data is retransmitted. The predetermined time is set to, for example, 0.9 sec. Thereafter, the data is retransmitted for approximately 1.5 sec (D).

If a plurality of power supplies is included, the foregoing instantaneous discontinuation of voltage application presumably occurs relatively frequently. In FIG. 6, (c) denotes a period during which the instantaneous discontinuation occurs frequently. Similarly to the period (b) in FIG. 6, the instantaneous discontinuation occurs (A) and the voltage at the output voltage terminal is detected to be low at a time instant L2 (F). In this case, after a predetermined time (0.9 sec) elapses, the control unit 21 starts retransmitting data (D). At this time, if the instantaneous discontinuation recurs, the DSP 51 cannot receive data transmitted during a time interval T2. However, the voltage at the output voltage terminal (alive terminal) of the DSP 51 is driven high to get stable, though the leading part or middle part of the data is not received. Therefore, although part of the data sent from the control unit 21 is not received, that is, the DSP 51 is not activated normally, activation may be terminated.

As mentioned above, the television receiver 1 is provided with two power circuits, that is, the power circuit for feeding supply power to the major circuits and the power circuit for feeding supply power to the control system in efforts to minimize power consumption required in a standby state. In the television receiver 1, when an input ac supply voltage drops instantaneously, the control unit 21 immediately judges if an abnormality has occurred in the power circuit that feeds power to the major circuits. The control unit 21 then re-executes initialization. An incorrect action stemming from the instantaneous drop of the input ac supply voltage can therefore be prevented. In contrast, when an instantaneous decrease in a current occurs intermittently, initialization is repeated. Consequently, it takes too much time to complete activation.

In the television receiver 1 of the present embodiment, as mentioned above, a device left intact because an activation error has occurred is recorded by setting the flag that indicates occurrence of an activation error. After activation is executed for all the devices, the device left intact can be reactivated. The drawback that activation of the entire receiver is not completed because activation of one of the plurality of devices is not completed can be overcome.

The time constant required for discharging the smoothing capacitor C21 connected to the second switching power circuit 42 that is a power circuit for feeding power to the control system is made larger than that required for discharging the smoothing capacitor C11 connected to the first switching power circuit 33. The second switching power circuit 42 that feeds power to the control system alone may be realized with a small-capacity power supply. Therefore, even if the time constant required for discharging the smoothing capacitor C21 is increased, a capacitor to be realized as the capacitor C21 need not offer a very large capacitance.

Moreover, according to the present embodiment, the power circuit for feeding power to the major circuits is independent of the power circuit for feeding power to the control system. A load impedance offered by the secondary circuit of the second switching power circuit 42 does not vary depending on whether the television receiver is on standby or in operation. The time constant required for discharging the smoothing capacitor C21 can be made larger than the time constant required for discharging the smoothing capacitor C11.

According to the aforesaid embodiment, the power circuit for feeding power to the major circuits is realized as the first switching power circuit 33. The power circuit for feeding power to the major circuits may be composed of a plurality of power circuits, and the secondary voltages of the power circuits may be monitored. Moreover, according to the present embodiment, the power circuits are realized with switching power circuits that include switching devices. Alternatively, the power circuits may be realized with power circuits of any other type.

According to the aforesaid embodiment, the power circuits receive the input ac supply voltage that ranges from 110 V to 240 V. Alternatively, the power circuits may not cope with the alternating voltage. Moreover, the supply voltage value maybe 100 V or any other value. In the aforesaid embodiment, the power circuits convert a mains ac supply voltage to a dc low voltage. The present invention can be implemented in equipment including any other type of power circuit that converts a dc supply voltage developed automatically from a battery into a dc low voltage.

The present embodiment has been described on the assumption that the present invention is implemented in an electronic equipment composed of a plurality of devices that is a television receiver, or more particularly, in a DSP that treats sounds. However, the present invention is not limited to the sound-treating device. Alternatively, all devices may be checked to detect a device in which an activation error has occurred. After activation is executed for all the devices, the detected device may be reactivated.

The present invention can be implemented in any electronic equipment in which a power supply for feeding power to major circuits must be included independently of a power supply for feeding power to a control system. For example, the present invention may be implemented in audio equipment such as a stereo sound reproduction system in which an audio signal produced by an audio signal source (a tuner and a disk reproduction unit) is processed by an amplifier, and sounds are radiated from a loudspeaker.

The present invention is not limited to the aforesaid embodiment. Needless to say, various modifications can be made within the scope of the invention without a departure from the gist thereof.

What is claimed is:

1. An electronic equipment comprising:
    a plurality of electronic devices in each of which an operating condition is controlled by an externally-supplied control data; and
    a control unit for supplying said control data to each of said plurality of electronic devices over a bus, the control unit having:
        a memory that stores said control data that is transferred to said plurality of electronic devices upon power-on of said electronic equipment;
        an activation control portion that activates and controls the operating condition of each of said plurality of electronic devices by supplying said control data from said memory to said plurality of electronic devices successively;
        an activation control error detecting portion that detects whether an activation error has occurred in one or more of said plurality of electronic devices by checking an acknowledge response received from each of said plurality of electronic devices in response to the control data; and
        a reactivation control portion that reactivates one or more of said plurality of electronic devices when the activation error is detected in said one or more of said plurality of electronic devices, after said control data is supplied to all of said plurality of electronic devices.

2. The electronic equipment according to claim 1, wherein said activation control portion continues activation even if no acknowledge response is received from any of said plurality of electronic devices, and then terminates the activation.

3. The electronic equipment according to claim 1, wherein said activation control error detecting portion records an activation error occurring in any of said plurality of electronic devices by setting a flag.

4. The electronic equipment according to claim 1, wherein when no acknowledge response is received from any of said plurality of electronic devices for a predetermined period, said activation control error detecting portion records an activation error by setting a flag.

5. The electronic equipment according to claim 1, wherein said activation control portion repeats activation until the detected electronic device in which an activation error has occurred becomes workable.

6. An activation method for electronic equipment having a plurality of electronic devices in each of which an operating condition is controlled by an externally-supplied control data, the method comprising the steps of:

supplying said control data upon power-on of said electronic equipment to each of said plurality of electronic devices successively over a bus to activate each of said plurality of electronic devices;

detecting whether an activation error has occurred in one or more of said plurality of electronic devices by checking an acknowledge response received from each of said plurality of electronic devices in response to the control data; and reactivating one or more of said plurality of electronic devices when the activation error is detected in said one or more of said plurality of electronic devices, after said control data is supplied to all of said plurality of electronic devices.

7. The activation method for electronic equipment according to claim 6, wherein even if no acknowledge response is received from any of said plurality of electronic devices, activation is continued for each of the plurality of electronic devices and then terminated.

8. The activation method for electronic equipment according to claim 6, wherein an activation error occurring in any of said plurality of electronic devices is recorded in a memory by setting a flag.

9. The activation method for electronic equipment according to clam 6, wherein if no acknowledge response is received from any of said plurality of electronic devices for a predetermined period, an activation error occurring in the electronic device is recorded in a memory by setting a flag.

10. The activation method for electronic equipment according to claim 6, wherein activation is repeated until the detected electronic device in which an activation error has occurred becomes workable.

* * * * *